(12) United States Patent
Pillutla et al.

(10) Patent No.: US 7,069,469 B2
(45) Date of Patent: Jun. 27, 2006

(54) VERSIONING AND REPLAYING PERFORMANCE TUNING PROJECTS

(75) Inventors: Raghavender R. Pillutla, San Jose, CA (US); Yousef R. Yacoub, San Jose, CA (US); Thierry Violleau, Mountain View, CA (US); Manish Malhotra, New York, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 577 days.

(21) Appl. No.: 10/328,781

(22) Filed: Dec. 23, 2002

(65) Prior Publication Data

US 2003/0177413 A1   Sep. 18, 2003

Related U.S. Application Data

(63) Continuation-in-part of application No. 10/099,584, filed on Mar. 14, 2002.

(51) Int. Cl.
*G06F 11/00*   (2006.01)

(52) U.S. Cl. .............................. 714/26; 714/37; 706/50; 706/53

(58) Field of Classification Search .................. 714/26, 714/27, 37, 38
See application file for complete search history.

(56) References Cited

U.S. PATENT DOCUMENTS

| 5,111,384 | A | * | 5/1992 | Aslanian et al. | ............ 714/26 |
|---|---|---|---|---|---|
| 5,446,901 | A | | 8/1995 | Owicki et al. | ............ 395/700 |
| 5,797,135 | A | * | 8/1998 | Whalen et al. | ............ 706/53 |
| 6,349,336 | B1 | | 2/2002 | Sit et al. | ............ 709/227 |
| 6,560,589 | B1 | * | 5/2003 | Stier et al. | ............ 706/50 |
| 6,820,044 | B1 | * | 11/2004 | Groen et al. | ............ 703/2 |
| 6,889,219 | B1 | * | 5/2005 | Epstein et al. | ............ 706/45 |

OTHER PUBLICATIONS

Hertz, Matthew et al., "Error-Free Garbage Collection Traces: How to Cheat and Not Get Caught", Department of Computer Science University of Massachusetts, Amherst, MA 01003 {hertz,steveb,moss}@cs.umass.edu, 14 pages.

* cited by examiner

*Primary Examiner*—Robert Beausoliel
*Assistant Examiner*—Yolanda L. Wilson
(74) *Attorney, Agent, or Firm*—Gunnison, McKay & Hodgson, L.L.P.

(57) ABSTRACT

Versioning may be utilized in a knowledge base decision tree in order to provide several useful features. To accomplish this, when a decision tree is traversed, the decision tree representing a knowledge base and having non-leaf nodes with one or more branches representing possible symptoms, and leaf nodes with no branches, branches may be followed corresponding to symptoms experience by the application until a leaf node is reached. This traversal may be recorded as a version, with subsequent traversals having a different version. This allows a user to rerun performance tuning either from the beginning or from an earlier node without having to re-enter information already provided. It also allows a user to resume the performance tuning should he be interrupted in the middle, such as by a crash or by having to halt a long traversal.

8 Claims, 12 Drawing Sheets

| Diagnosis | Remedy | Symptoms | Probe/user Input |
|---|---|---|---|
| Excessive paging | 1. Possibility of memory leaks. Suggest tools to monitor/fix memory leaks 2. If no memory leaks found, recommend larger system | 1. high scan rate 2. high system time 3. gowing memory footprint (If memory leaks) Specific tests: 1. scan_rate > 300/sec 2. sys_time > 0.7* user_time 3. process footprint grows as measured by pmap | vmstatProbe pmapProbe |
| ↑ 1 | ↑ 2 | ↑ 3 | ↑ 4 |

FIG. 1B

```
<ANALYSIS NAME="CPURoot" DESCRIPTOR="&COLLECTOR;cpu/
descriptors/CPUMainDescriptor.xml">
                                                            500
<DESCRIPTION>CPU usage analysis</DESCRIPTION>
<!--check if system time is higher than 20% -->
<SYMPTON TEST="&SysTime;>20">
                                        502
<ANALYSIS>
<DESCRIPTION>High system time detected</DESCRIPTION>
<SYMPTOM TEST="(&VMStateSR; div $Interval) > 300">   504
<DIAGNOSIS NAME="SRDiagnosis"TEXT="&DIAGNOSIS-PAGE;cpu/
content/ScanRateDiagnosis.html">   506
                                                       508
<DESCRIPTION>High scan rate</DESCRIPTION>
<REMEDY NAME="ScanRateRemedy"TEXT="&REMEDY-PAGE;cpu/
content/ScanRateRemedy.html">
    <DESCRIPTION>Scan Rate remedy</DESCRIPTION>
</DIAGNOSIS>
</SYMPTOM>
</ANALYSIS>
</SYMPTOM>
</ANALYSIS>
```

FIG. 5

```
<?xml version="1.0"?>

<COLLECTION NAME="CPUMainDescriptor" DATE="Nov 21, 2002"
DESCRIPTOR="null"HOST="technopark"
HOSTADDRESS="129.145.25.176">
<SAMPLE NAME="VmstatSampler" TIME="1037918592283">
<DATA PROBE="probeVmstat" RAWDATA="jar:file:/tmp/VMStat Data
Collection/tempRawData.jar!/
CPUMainDescriptor.0.VmstatSampler.probeVmstat.txt">
<VALUE COMPUTED="TRUE"
NAME="VMStatSysTime">61.233333333333334</VALUE>

<VALUE COMPUTED="TRUE"
NAME="VMStatUserTime">34.6666666666666664</VALUE>

<VALUE COMPUTED="TRUE"NAME="ScanRate">51.4</VALUE>
</DATA>
</SAMPLE>
</COLLECTION>
```

FIG. 6

VERSIONING AND REPLAYING PERFORMANCE TUNING PROJECTS

CROSS-REFERENCE TO RELATED APPLICATION

This application is a continuation in part of U.S. Ser. No. 10/099,584 filed Mar. 14, 2002, in the name of inventors Manish Malhotra, Thierry Violleau, Christopher Atwood, Shakil Ahmed, Peter Boothby, Sridhar Chava, Agnes Jacob, Ilya Sharapov and Prashant Srinivasan, entitled, "System and Method for Remote Performance Analysis and Optimization of Computer Systems".

FIELD OF THE INVENTION

The present invention relates to software. More particularly, the present invention relates to versioning and replaying performance tuning projects for software applications.

BACKGROUND OF THE INVENTION

Computer programs, which are essentially sets of instructions that control the operation of a computer to perform tasks, have grown increasingly complex and powerful. While early computer programs were limited to performing only basic mathematical calculations, current computer programs handle complex tasks such as voice and image recognition, predictive analysis and forecasting, multimedia presentation, and other tasks that are too numerous to mention.

Software developers typically produce a software component in an iterative process from idea conception to prototyping, testing, performance analysis and through to production. The step in this process of analyzing and optimizing performance of a software component often relies on knowledge and skill outside the scope of a typical developer's everyday tasks. Computer systems have become so complex that the average software developer does not have the skills or time to perform this vital task in this stage of the development process.

A definite need exists for a system and method which delivers interactive, semi-automated, comprehensive and dynamic performance analysis tools that give individual developers or users the collected 'tuning' knowledge for a wide variety of software and hardware products that they would not normally have access to. As such, it would be beneficial to provide a model for performance tuning applications that satisfies these criteria.

Additionally, once a user receives a proposed remedy from a performance tuning model, the user may implement it and it the problem still may not be solved. It would be beneficial if the model had a mechanism such that the user would not have to repeat all the steps he had to go through during previous traversals through the model. For example, it would be beneficial if the user would not have to answer the same questions and/or provide the same information over again.

BRIEF DESCRIPTION OF THE INVENTION

Versioning may be utilized in a performance tuning exercise or performance tuning project in order to provide several useful features. To accomplish this, when a decision tree is traversed, the decision tree representing a knowledge base and having non-leaf nodes with one or more branches representing possible symptoms, and leaf nodes with no branches, branches may be followed corresponding to symptoms experience by the application until a leaf node is reached. This traversal may be recorded as a version, with subsequent traversals having a different version. This allows a user to rerun performance tuning either from the beginning or from an earlier node without having to re-enter information already provided. It also allows a user to resume the performance tuning should he be interrupted in the middle, such as by a crash or by having to halt a long traversal.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1B is a table illustrating a library of symptom descriptions, a corresponding library of diagnoses, a corresponding library of remedies, and a corresponding library of probe according to one embodiment of the present invention.

FIG. 5 is a diagram illustrating an example decision tree in XML in accordance with an embodiment of the present invention.

FIG. 6 is a diagram illustrating a collection descriptor in accordance with an embodiment of the present invention.

DETAILED DESCRIPTION

Embodiments of the present invention are described herein in the context of a system and method for remote performance analysis and optimization of computer systems. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines.

Figure 1A:
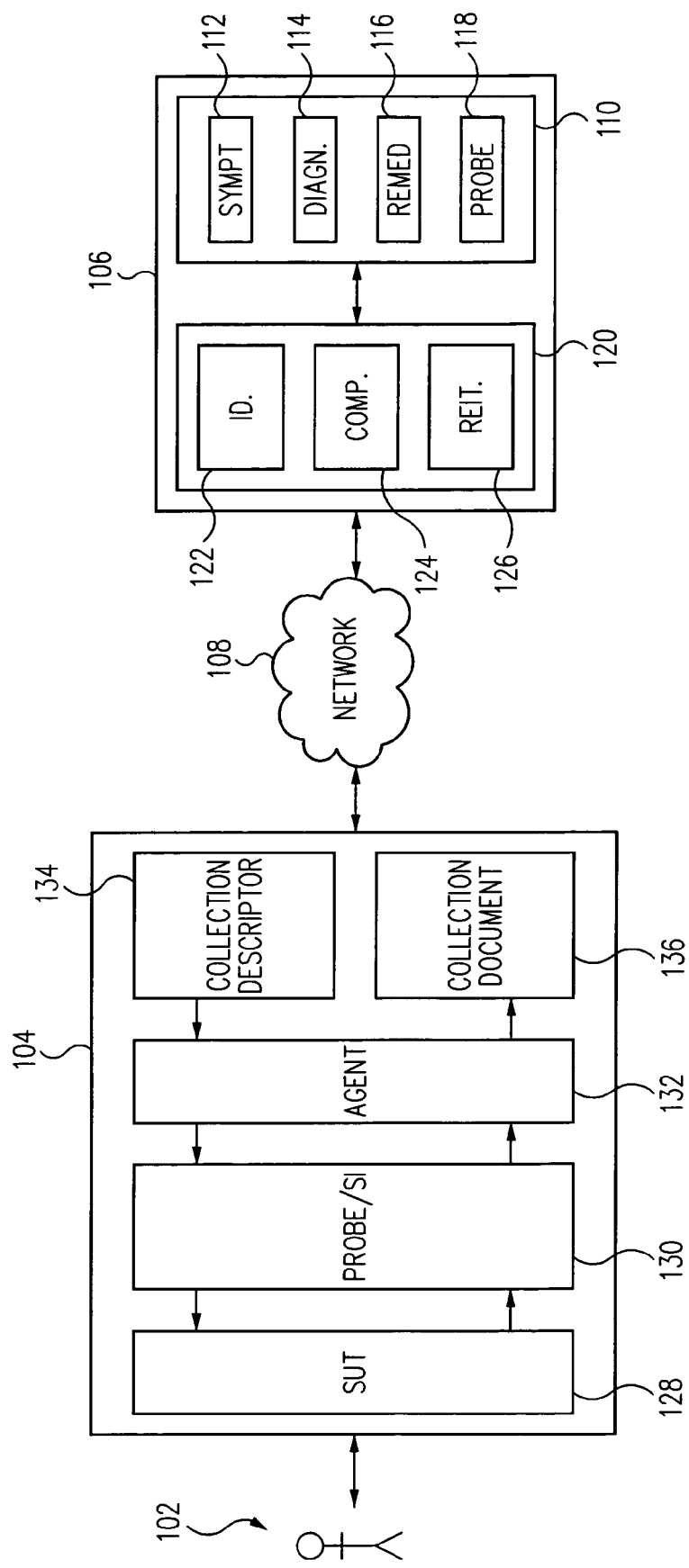
FIG. 1A is a schematic diagram of a network computer system illustrating a process for remote performance analysis in accordance with one embodiment of the present invention.

A representative hardware environment 100 suitable for a user 102 is illustrated in FIG. 1A, where a networked computer system 104 communicates with another networked computer system 106 through a network 108. Network 108 represents any type of networked interconnection, including but not limited to local-area, wide-area, wireless, and public networks (e.g., the Internet). The computer system 104 may comprise a "client system" and the computer system 106 may comprise a "server system".

In accordance with one embodiment of the present invention, server system 106 comprises a memory 110 and analysis software 120, also referred to as an "analyzer". Memory 110 stores a library of symptom descriptions 112, a corresponding library of diagnoses 114, a corresponding library of remedies 116, and a corresponding library of probes 118. The analysis software 120 comprises an identifier 122, a comparator 124, and a reiterator 126.

FIG. 1B illustrates an example of the libraries stored in memory 110. The example illustrates symptoms, diagnoses, corresponding remedies, corresponding probes in the context of excessive paging. In column 1, the diagnosis found was excessive paging. Remedies in column 2 include suggestions for monitoring or fixing memory leaks. If no memory leaks were found, the remedy would be a recommendation for a larger system. In column 3, symptoms of memory leaks include high scan rate, high system time, growing memory footprints. The corresponding probes are "vmstatProbe" and "pmapProbe" illustrated in column 4. Because memory leaks are generally hard to pinpoint, the library provides suggestions for remedial action in either case (if memory leak is found or not).

The following is an example of a code written as a Korn-shell script for the probe "vmstatProbe" illustrated in FIG. 1B:

Vmstat 1 10|(echo ":"; sed '
1 d
3 d
s/^[\t]*//g
s/[\t][\t]*/:/g')

The actual code definition need not be part of memory 110, although putting it in memory 110 is possible. According to another embodiment of the present invention, memory 110 stores information collected from external sources and systems organized in a codified set of; for example, environments and corresponding tests, causes and corresponding effects, situations and corresponding remedy rules. Memory 110 comprises a collection of information codified with an independent platform language, such as, for example, extensible Markup Language (XML). XML is a web-friendly markup language that provides platform-independent way of marking up structured data sets. For illustration purposes, the collection of information comprises, for example, rules relating to tests to be performed on a System Under Test (SUT) 128 on client system 104 with the user's hardware and software environment, rules relating to probable causes with corresponding effects measured by client system 104, rules relating to probable remedies with corresponding causes, rules relating to probable solution documentation with corresponding remedies. The previous rules are for illustration purposes and may further comprise other rules appropriate for performance analysis and diagnosis of the client system 104. FIG. 1B illustrates an example of rules relating to probable remedies with corresponding causes.

The system architecture prescribes that the implementation of memory 110 and analysis software 120 be independent of the platform of client system 104 so that the implementation of the system functionality may be independent from various technologies. In particular, the prescribed interface specification, based on XML documents, for communication between client system 104 and server system 106 where client system 104 remains stable in the face of functional changes on server system 106. One of ordinary skills in the art will recognize that other structural languages may be implemented as an alternative embodiment.

According to one embodiment, analysis software 120 accesses memory 110, communicates and controls client system 104 through network 108 for data collection, user interaction, symptom identification, and presentation of probable remedies. Analysis software 120 comprises a set of software programs, which uses the information in memory 110 to gather environmental factors from user 102 about the System under Test (SUT) 128. Analysis software 120 also commands client components (Probe(s) 130 and Agent 132) on the SUT 128 to run prescribed performance analysis programs and receives a collection of performance statistics from the prescribed tests. Analysis software 120 then analyzes the returned statistics for possible performance problems based on the codified rules in memory 110. The analysis software is essentially a software representation of the knowledgebase. Analysis software 120 optionally commands client components to run further tests in an attempt to narrow the scope of problem isolation and presents a set of probable diagnoses and their related remedy documentation from memory 110. This process may be reiterated until user 102 signifies satisfaction or dissatisfaction with the results or until a diagnosis from the memory 110 corresponds with the symptoms described by the collected data. Analysis software 120 further stores the user's satisfaction reply in memory 110 for further enhancement to the reasoning process, either through manual human intervention or automatically through an Analysis Wizard logic (not shown).

According to another embodiment, analysis software 120 comprises a software program that calculates probabilities based on the following inputs: environmental conditions on the SUT 128 (collected automatically or interactively by Agent 132), performance data collection from client components, and user feedback on accuracy of previous probability calculations. Analysis software 120 makes calculations by traversing a tree-structure of cause/effect "nodes" held in memory 110. The logic follows user 102 experience in that it has the following functions: taking input about SUT 128 and determining what probe(s) from the corresponding library of probes 118 to run, receiving output of the selected probe(s) 130 and identifying possible or probable performance deficiencies. Based on the given performance deficiencies, proper documentation and remedy is identified so that user 102 can read to understand and improve their client system 104 or application performance of SUT 128. The functionality of the analysis software 120 is further described in more detail below.

According to one embodiment, client system 104 comprises software modules: Probe(s) 130 and Agent 132, both interacting with user 102, automatically collecting performance data from client system 104, in particular SUT 128, transferring measured statistics to server system 106, and presenting results and remedy documentation to user 102. The probe(s) 130, also known as performance probes, are software programs that measure specific performance statistics on the SUT 128. Each probe 130 produces output in a standard data format ("the Collection") to be used by other system components. Probe(s) 130 executes for a defined time period, until a specific observed event occurs, or until stopped by the user or another program.

Agent 132, also known as a "Collector Agent", is a software program user 102 runs interactively. Agent 132 may be downloaded from server system 106 over network 108. Agent 132 then downloads and installs probe(s) 130 from the corresponding library of probes 118 if the needed probes are not available on client system 104. Probes 130 have knowledge of their version number that can be queried by Agent 132 to determine if the appropriate probe is installed on client system 104. Agent 132 also receives one or more Collection Descriptors 134 from server system 106 specifying what probe names and versions to execute. Agent 132 then executes selected probe(s) 130 automatically or with user interaction on the SUT 128. Agent 132 then filters and formats output statistics returned by probe(s) 130. Collection Descriptors 134 may define a subset of data that is output by probe(s) 130, in which case Agent 132 removes selected data or inserts calculated results to be returned to analysis software 120. Such data output may conform to the API standard defined for communication with server system 106. Agent 132 is also responsible for transferring formatted and raw (i.e. unfilter and unformatted) statistics data ("Collection Document" 136) to server system 106 over network 108.

According to another embodiment, for every data collection instance, Agent 132 downloads Collection Descriptors 134 (an XML document containing the details of what probe 130 to run and what information to be filtered from their output). The collected data may be categorized at a high level into one of the five following categories: static (system-wide), dynamic (system-wide), static (application specific), dynamic (application specific), and interactive (dialogue-driven data specified by the user).

Based on information contained in Collection Descriptors 134, Agent 132 runs the appropriate probe(s) 130 and post-processes the output data. According to one embodiment, before this post-processing, probe(s) 130 preferably generates a two-dimensional "grid" of output data addressable by cells (row and column) in a format understood by Agent 132—this is also termed "raw data". The collected data is organized as the "Collection Document" 136, which is an XML document containing the static configuration (only in the first collection) and a set of samples. Each sample is based on the output of probe(s) 130, propounded by attributes such as row-count, start time, and duration.

According to one embodiment, the SUT 128 comprises a software application to be probed and analyzed.

Figure 2:
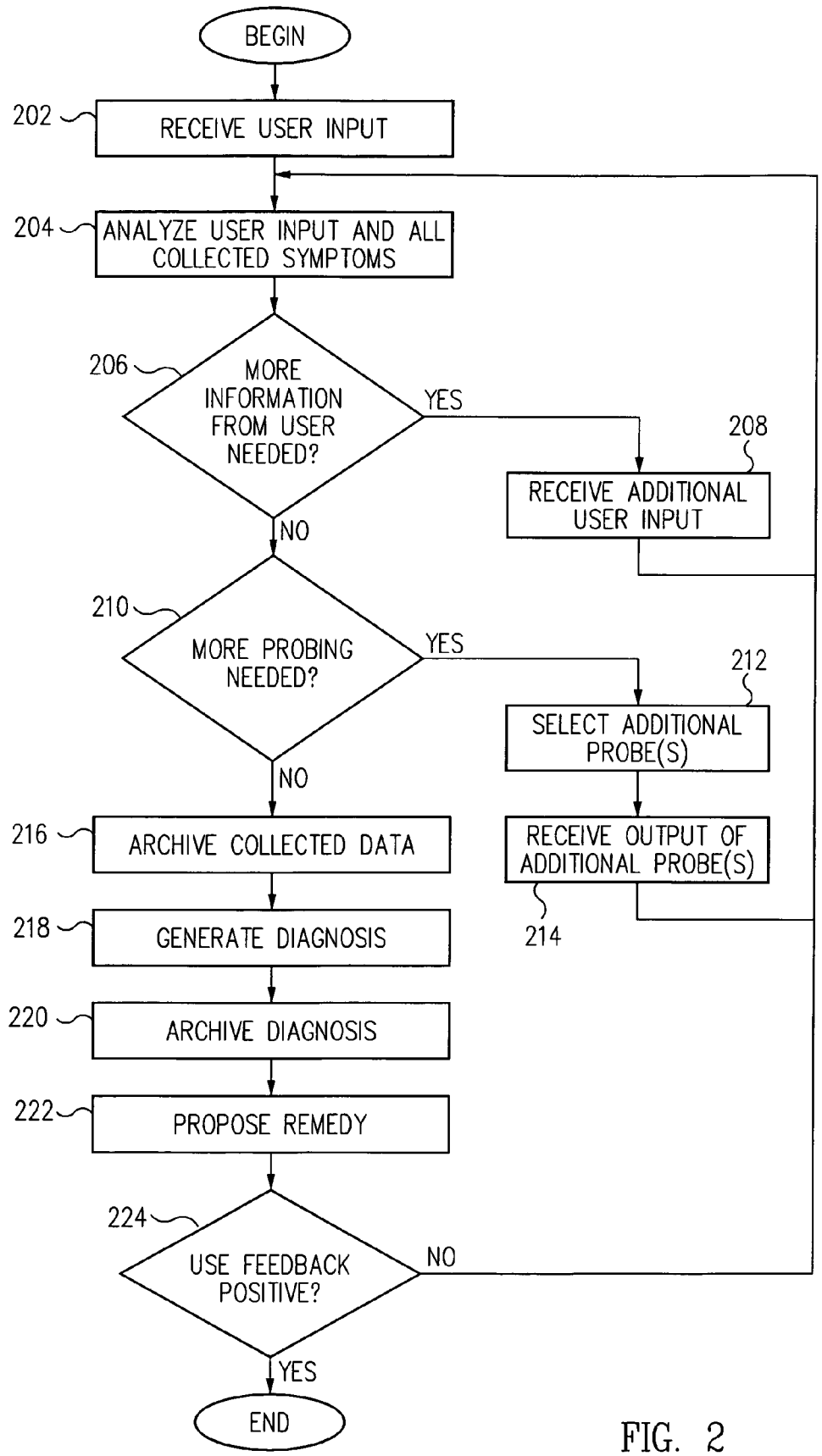
FIG. 2 is a flow diagram illustrating a server side operation of a process for remote performance analysis in accordance with one embodiment of the present invention.

Turning now to FIG. 2, a flow chart illustrating a server side method for remote performance analysis according to a specific embodiment of the present invention is shown. User 102 begins interaction with server system 106, by loading through network 108, an authentication web page (not shown) in a web browser (not shown) on client system 104. Client system 104 comprises SUT 128 and a web browser (not shown). The authentication page (not shown) contains a form (not shown) for the user's login and password. After entering this information, user 102 submits the form to the server system 106 where the user's login is validated and his/her session commences. Server system 106 provides user 102 with a set of tools for managing "measurement sessions" through a project-based database. Thus, user 102 may utilize server system 106 for multiple SUTs over time. Results are saved and user 102 can interrupt the measurement session to be continued at a later time.

After login, user 102 is presented with another browser form, an initial page, that user 102 fills in a user input with information describing symptoms of the SUT 128. Such symptom description may include a description software and hardware on the SUT 128. The user input may also include symptoms describing problems on SUT 128. The information entered may also include, but is not limited to: application type (e.g. operating system binary or Java byte-code), identification of application (e.g. binary filename or Java class name), process ID of in-memory executable, locations of software components on disk, and duration of the user's workload. This information may be archived in memory 110. User 102 may also give the problem description a name that can be related to a particular project. At a first block 202, server system 106 receives the user input.

At 204, Analyzer 120 of server system 106 receives the user input and makes a decision as to what performance tests, if any, need to be carried out on the SUT 128. In particular, Analyzer 120 takes into account all information collected from user 102 and SUT 128 to identify the symptoms of the SUT 128. All collected information may include the initial user input, any additional user input, and data output of selected probes based on the user input(s). The selected probe(s) from the corresponding library of probes 118 are selected based on the collected information. A particular set of symptoms may prompt Analyzer 120 to further probe the SUT 128 for more information to narrow down the corresponding diagnosis and remedy. According to one embodiment, Analyzer 120 comprises Identifier 122, Comparator 124, and Reiterator 126. Identifier 122 identifies symptoms from the collected information on the SUT 128 from the collected information. Comparator 124 compares the collected symptoms of the SUT 128 with the library of symptom descriptions 112 to correspond a set of symptoms in the library 112 with the collected symptoms of the SUT 128. Reiterator 126 reiteratively operates the Identifier 122 on the Comparator 124.

In decision block 206, if Analyzer 120 determines that it needs to gather more information from SUT 128, it may present user 102 with more questions. If more information is needed from user 102, Analyzer 120 receives additional information in block 208. Upon receipt of the additional user input in block 208, analyzer 120 repeats the data analysis of block 204.

In decision block 210, Analyzer 120 needs more information probed on SUT 128, one or more probes may be further selected from the corresponding library of probes 118 in block 212 with another Collection Descriptor 134.

After the additional probe(s) 130 are executed by Agent 132 on the SUT 128, Analyzer 120 collects output data from the additional probe(s) 130 in block 214. The additional output data is then analyzed in block 204.

According to one embodiment, client system 104 next downloads, for example, a Java applet (Agent 132) that controls the test software (the selected probes 130). If the required measurement component is not present on client system 104, it is downloaded by Agent 132 from server system 106 and installed on SUT 128. If probes 130 are out-of-date, they are replaced with up-to-date versions from server system 120. Furthermore, Agent 132 may download a collection descriptor 134 containing details of what probes to run and what information to be filtered from their output.

According to another embodiment, Agent 132 executes selected probe(s) 130 on SUT 128 either to collect static information about the SUT 128 or to collect information about the SUT 128's run-time characteristics. When probes 130 are finished executing, Agent 128 automatically transfers the results as a collection of raw data to Analyzer 120 for analysis.

According to an alternative embodiment, in block 216, all the collected information from the user inputs and the executed probes may be archived in memory 110 for future reference.

Once analyzer 120 is able to substantially match the collected information with a set of symptoms from the library of symptoms 112 in memory 110, a corresponding diagnosis from the corresponding library of diagnoses 114 is generated in block 218. A list of diagnoses may detail Analyzer 120 assumptions of probable performance deficiencies and their causes, listed in order of probability.

According to an alternative embodiment, in block 220, the diagnosis generated in block 220 may be archived in memory 110 for future reference.

Once the corresponding diagnosis is generated in block 218, a list of remedies from the corresponding library of remedies 116 may be proposed to user 102 at block 222. The remedies may include relevant resource suggestions and feedback collection from user 102 such as technical articles, tuning tips, or code examples. The remedies may also include referring user 102 to another source on the Internet.

According to an alternative embodiment, user 102 may provide a feedback about the resulting diagnoses and remedies at block 224. If the user feedback is negative, another analysis may be performed at block 204. Therefore, the process may be reiterated until the user 102 signifies satisfaction or dissatisfaction with the results. Such user's satisfaction may be stored in the memory 110 for further enhancement to the reasoning process.

Figure 3:
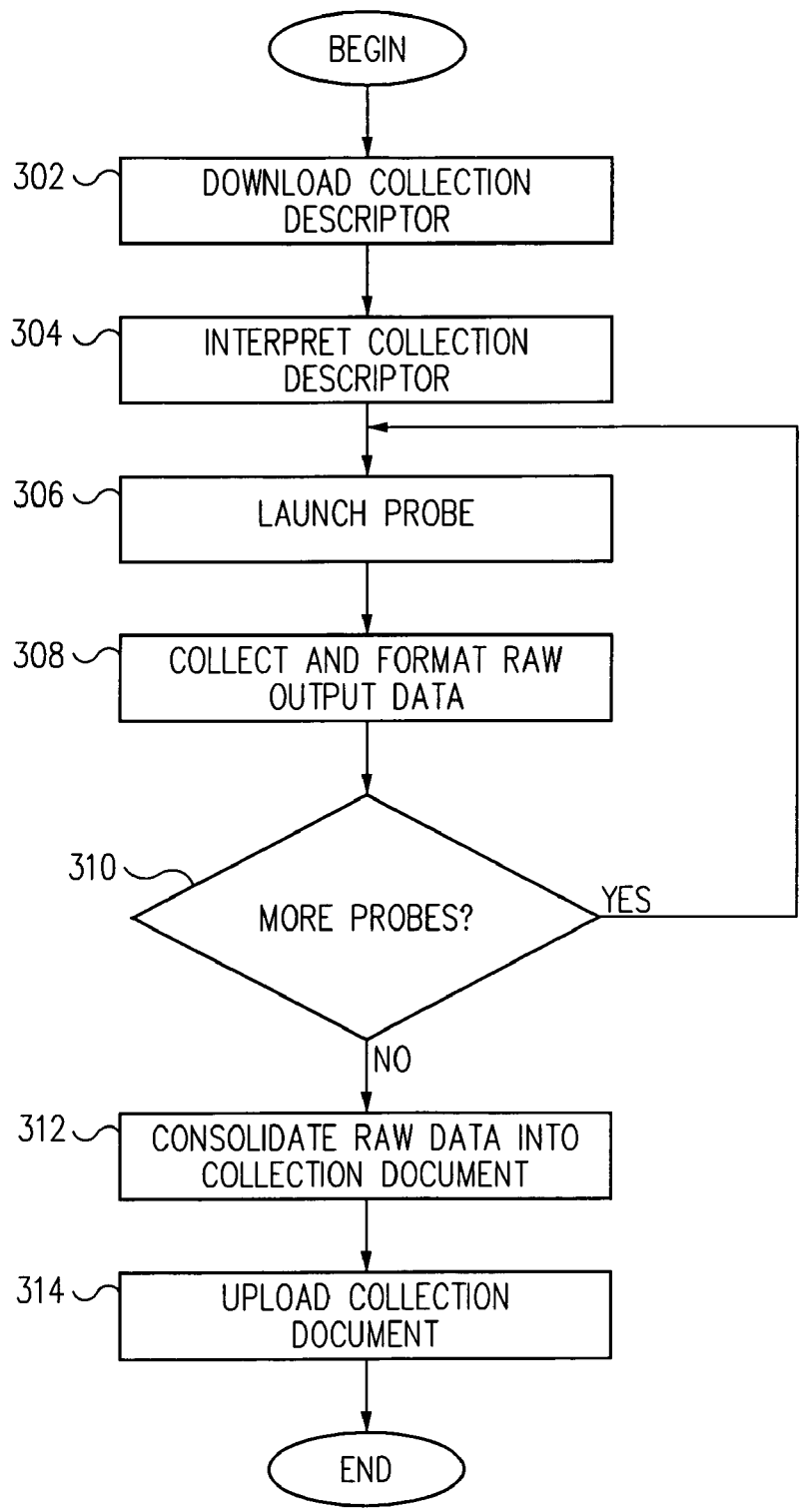
FIG. 3 is a flow diagram illustrating a client side operation of a process for remote performance analysis in accordance with one embodiment of the present invention.

Turning now to FIG. 3, a flow chart illustrating a client-side operation of a process for remote performance analysis according to a specific embodiment of the present invention is shown. When data collection through selected probes is needed on the SUT 128 of client system 104, Collection Descriptor 134 is generated in block 212 of FIG. 2. In block 302, Collection Descriptor 134 is downloaded to client system 132 through network 108 in a first block 302. In block 304, Agent 132 reads and interprets Collection Descriptor 134 in block 304 to find out which probes it needs to launch. In block 306, Agent 134 launches the selected probe 130 specified in the Collection Descriptor 134. In block 308, after the selected probe 130 is executed on the SUT 128, Agent 132 collects and format raw data generated by the selected probe 130. In decision block 310, if Collection Descriptor 134 specifies more than one selected probe, Agent 132 reiterates blocks 306 and 308 with the remaining selected probes.

Once all selected probes have been executed, Agent 134 consolidates all the raw data generated by the selected probes into a Collection Document 136 in block 312. Agent 134 then uploads the Collection Document 136 through network 108 to Analyzer 106 of the server system 106 for further analysis.

Figure 4:
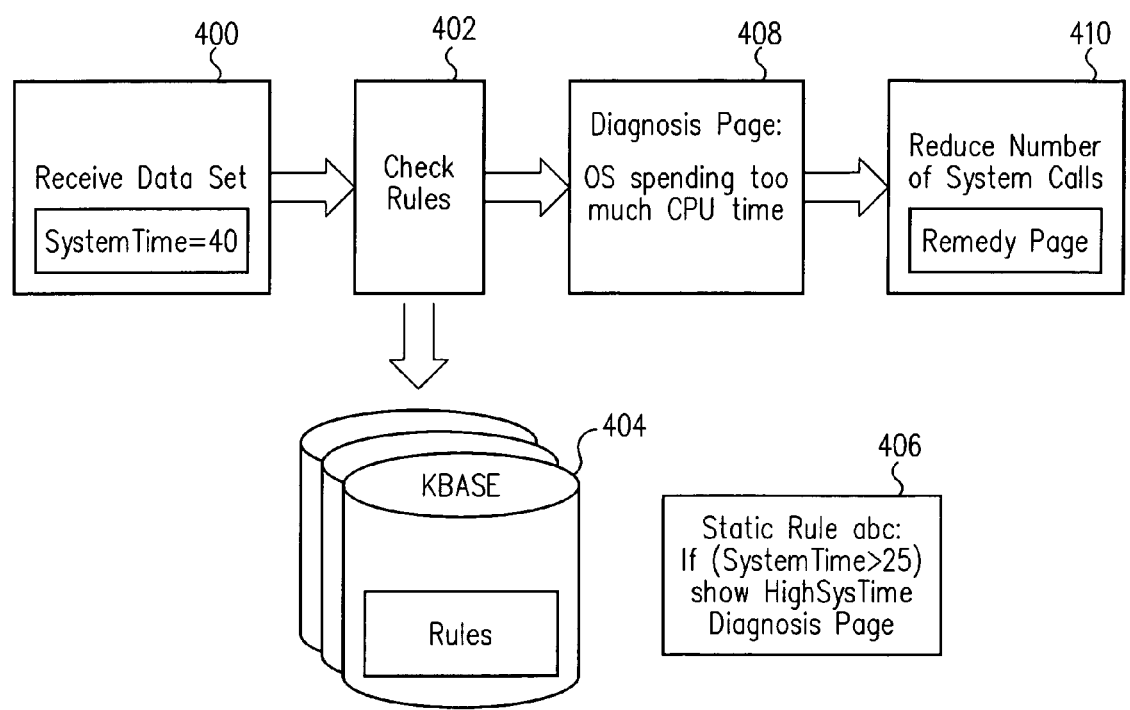
FIG. 4 is a diagram illustrating an overview of the interaction between data sets and the knowledge base in accordance with an embodiment of the present invention.

FIG. 4 is a diagram illustrating an overview of the interaction between data sets and the knowledge base in accordance with an embodiment of the present invention. A Data set is received 400. The data set may include, for example, information that the system time is 40. Then the rules in the knowledge base are checked 402. The knowledge base 404 is accessed. The knowledge base 404 contains one or more static rules describing the decision tree. In this example, the static rule 406 indicates that if the system time is greater than 25, the HighSysTime Diagnosis page should be displayed. Therefore, this page 408 is displayed, indicating that the Operating System is spending too much CPU time. Then, a remedy page 410 is displayed, indicating a proposed remedy (here, reducing the number of system calls).

FIG. 5 is a diagram illustrating an example decision tree in XML in accordance with an embodiment of the present invention. As a description 500 indicates, this tree represents a CPU usage analysis. Here, a rule (starting with symptom 502) indicates that the system time should be checked to see if it is higher than 20%. If that is the case, then a second rule (starting with symptom 504) indicates that certain variables should be checked. These variables may be received from a collection descriptor. If the rule is true, then a diagnosis tag 506 indicates that a high scan rate is the diagnosis. A remedy tag 508 indicates a proposed remedy for the diagnosis.

FIG. 6 is a diagram illustrating a collection descriptor in accordance with an embodiment of the present invention. Here, the results of 600 a probes 602 are described. This information may be compared with the decision tree on execution, hopefully resulting in the diagnosis of any problems.

Figure 7:
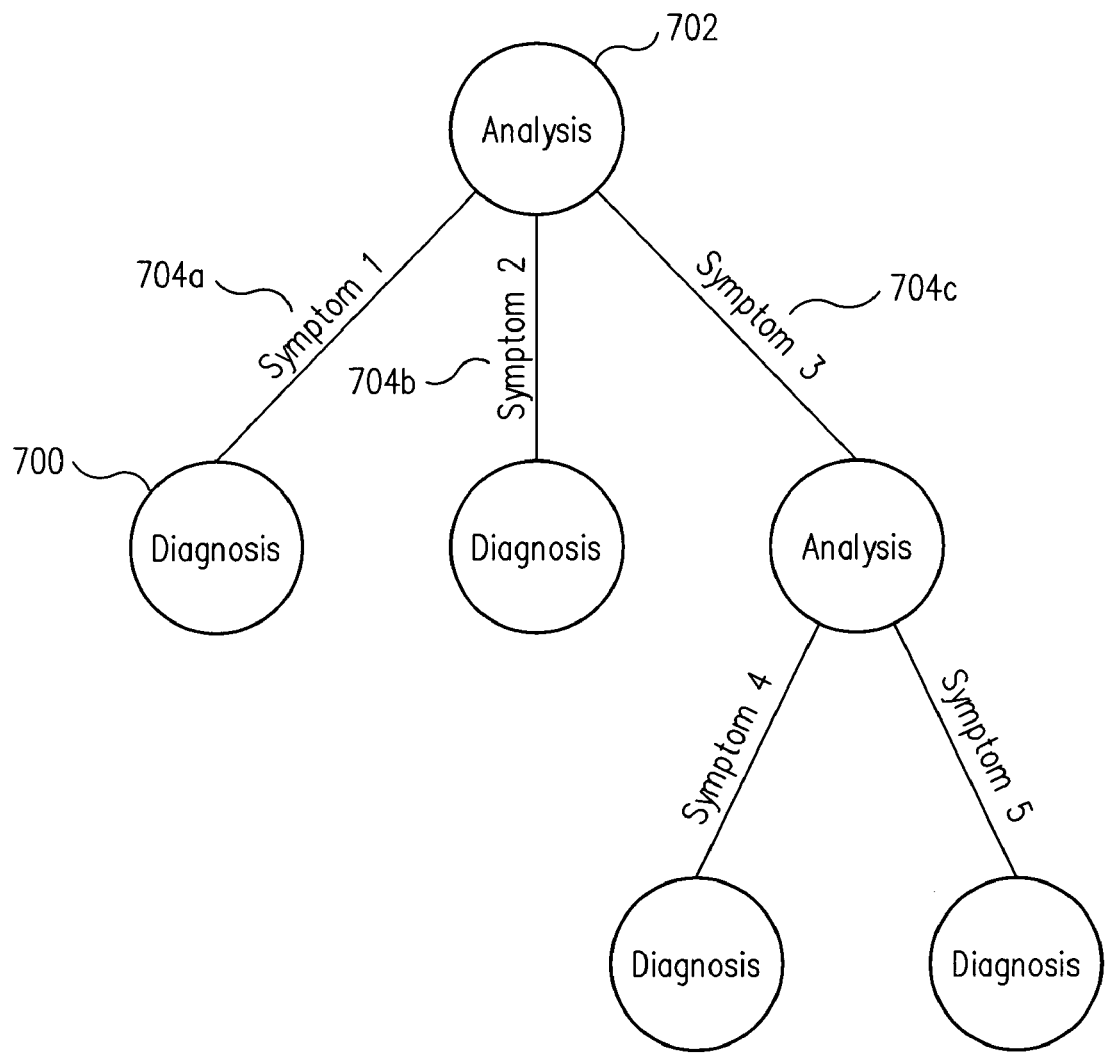
FIG. 7 is a diagram illustrating a knowledge base in accordance with an embodiment of the present invention.

FIG. 7 is a diagram illustrating a knowledge base in accordance with an embodiment of the present invention. In this embodiment, a decision tree is created for the knowledge base. Nodes of the decision tree are classified as analysis nodes or diagnosis nodes. A diagnosis node 700 is a leaf of the decision tree and indicates a proposed diagnosis for the problem and/or remedy of the problem. An analysis node 702 has one or more branches 704a, 704b, 704c which are classified as symptoms. Therefore, at an analysis node, if one of the symptoms exists, the corresponding symptom branch is traversed.

While the decision tree itself is static, at runtime, the decision tree may be dynamic. First, the initial data set is passed to the tree. However, at one of the analysis nodes, the decision tree may indicate that more information is required before continuing. The tree may collect this information and the decide how to traverse the rest of the tree. This may occur many times during the running of the performance tuning application. This iterative process allows a great deal of flexibility and reliability for the knowledge base.

Figure 8:
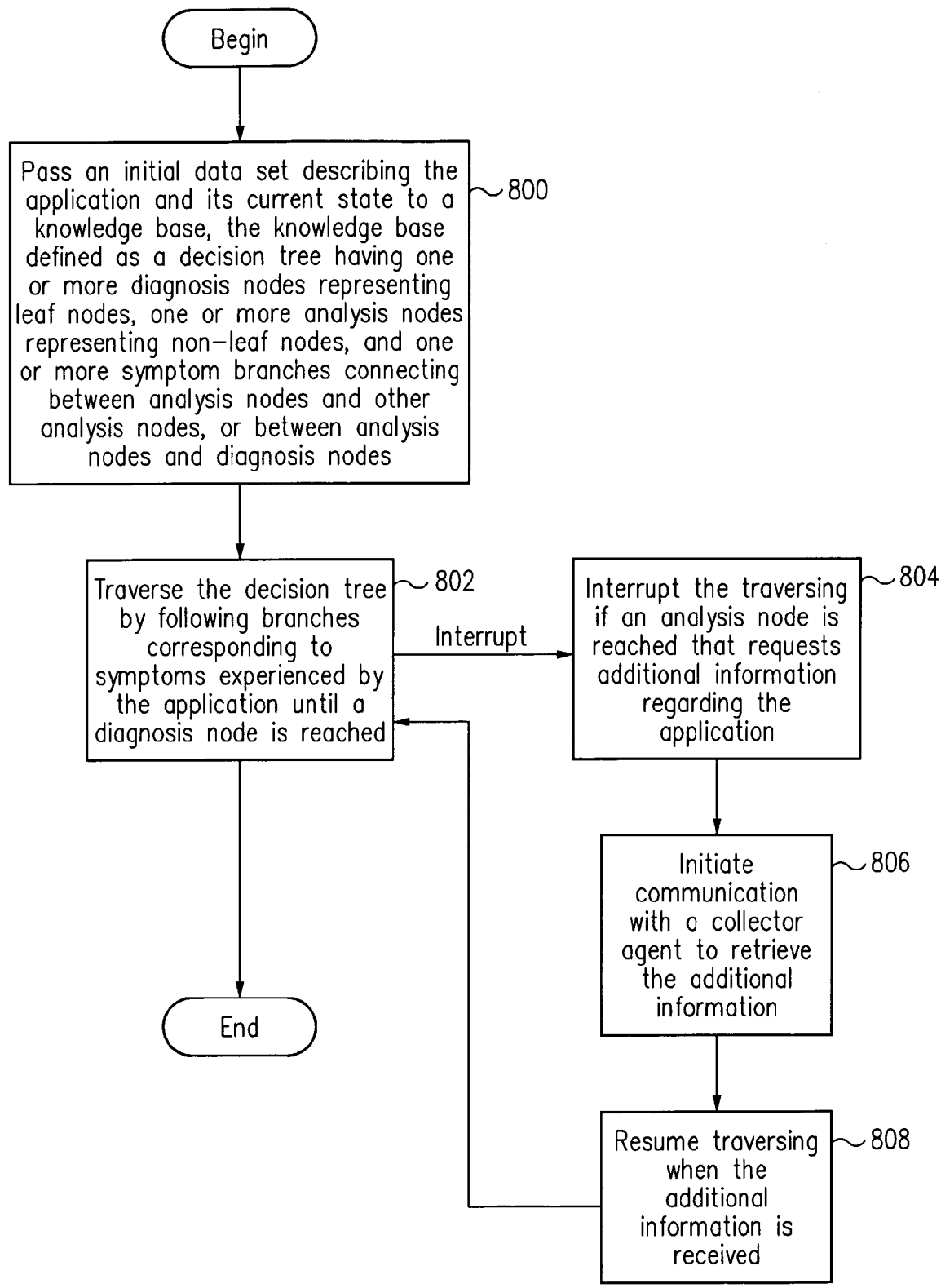
FIG. 8 is a flow diagram illustrating a method for diagnosing an application in accordance with an embodiment of the present invention.

FIG. 8 is a flow diagram illustrating a method for diagnosing an application in accordance with an embodiment of the present invention. At 800, an initial data set describing the application and its current state may be passed to a knowledge base, the knowledge base defined as a decision tree having one or more diagnosis nodes representing leaf nodes, one or more analysis nodes representing non-leaf nodes, and one or more symptom branches connecting between analysis nodes and other analysis nodes, or between analysis nodes and diagnosis nodes. The diagnosis nodes may indicate proposed diagnoses for the application and/or proposed remedies for the application. The symptom branches may indicate possible symptoms of the application. The analysis nodes may indicate information required to determine which symptom branches to follow during traversal. These analysis nodes may further indication additional information regarding the application that may be required to determine which symptom branches to follow during traversal. At 802, the decision tree may be traversed by following branches corresponding to symptoms experienced by the application until a diagnosis node is reached. At 804, the traversing may be interrupted if an analysis node is reached that requests additional information regarding the application. At 806, communication may be initiated with a collector agent to retrieve the additional information. This may include sending one or more collection descriptors to the collector agent, the collection descriptors defining one or more probes to execute and data to be filtered from the probes. Probes are programs that measure performance statistics on the application. At 808, the traversing may be resumed when the additional information is received.

Figure 9:
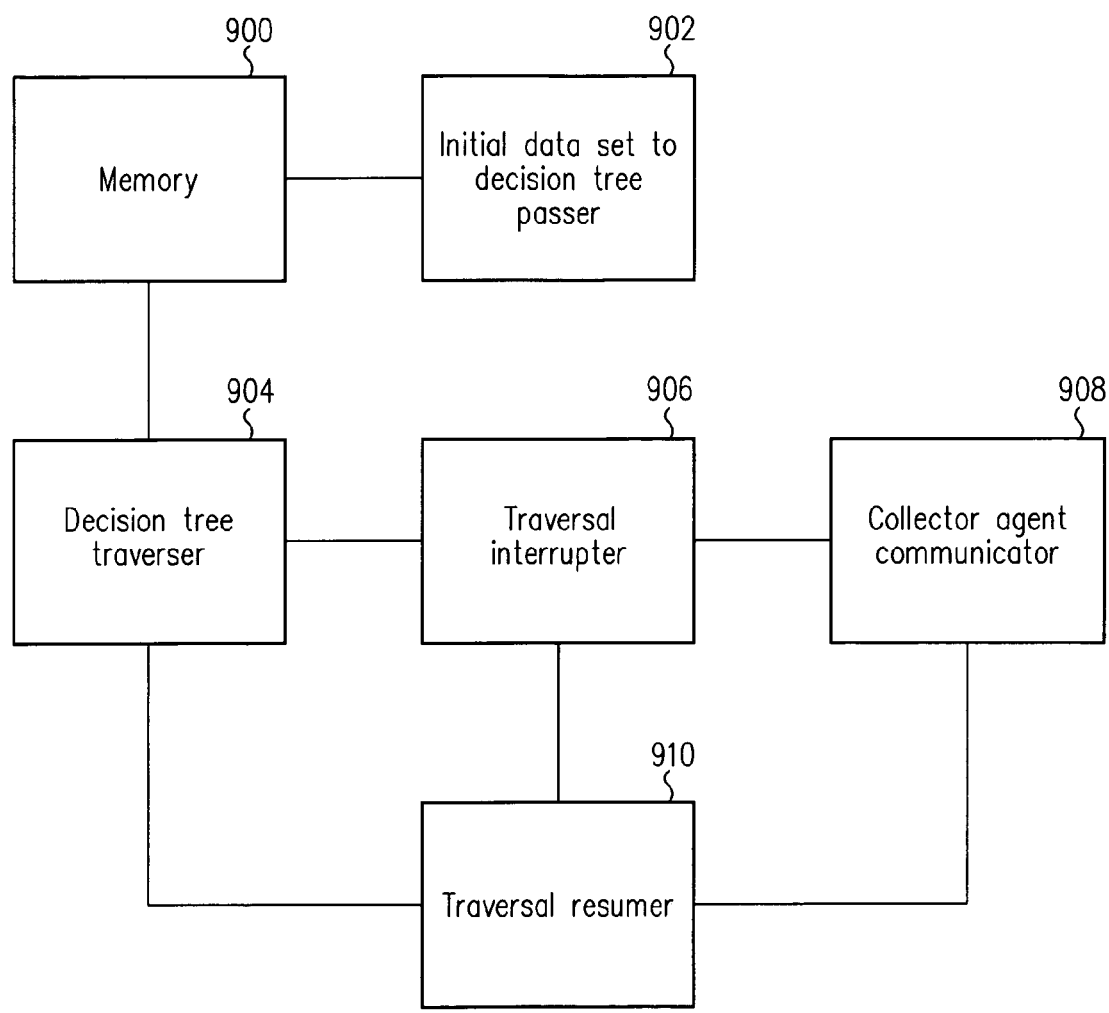
FIG. 9 is a block diagram illustrating an apparatus for diagnosing an application in accordance with an embodiment of the present invention.

FIG. 9 is a block diagram illustrating an apparatus for diagnosing an application in accordance with an embodiment of the present invention. A memory 900 may be used to store a knowledge base. An initial data set to decision tree passer 902 coupled to the memory 900 may pass an initial data set describing the application and its current state to the knowledge base, the knowledge base defined as a decision tree having one or more diagnosis nodes representing leaf nodes, one or more analysis nodes representing non-leaf nodes, and one or more symptom branches connecting between analysis nodes and other analysis nodes, or between analysis nodes and diagnosis nodes. The diagnosis nodes may indicate proposed diagnoses for the application and/or proposed remedies for the application. The symptom branches may indicate possible symptoms of the application. The analysis nodes may indicate information required to determine which symptom branches to follow during traversal. These analysis nodes may further indication additional information regarding the application that may be required to determine which symptom branches to follow during traversal. A decision tree traverser 904 coupled to the initial data set to decision tree passer 902 and to the memory 900 may traverse the decision tree by following branches corresponding to symptoms experienced by the application until a diagnosis node is reached. A traversal interrupter 906 coupled to the decision tree traverser 904 may interrupt the traversing if an analysis node is reached that requests additional information regarding the application. A collector agent communicator 908 coupled to the traversal interrupter 906 may initiate communication with a collector agent to retrieve the additional information. This may include sending one or more collection descriptors to the collector agent, the collection descriptors defining one or more probes to execute and data to be filtered from the probes. Probes are programs that measure performance statistics on the application. A traversal resumer 910 coupled to the traversal interrupter 906, the collector agent communicator 908 and to the decision tree traverser 904 may resume the traversing when the additional information is received.

Figure 10:
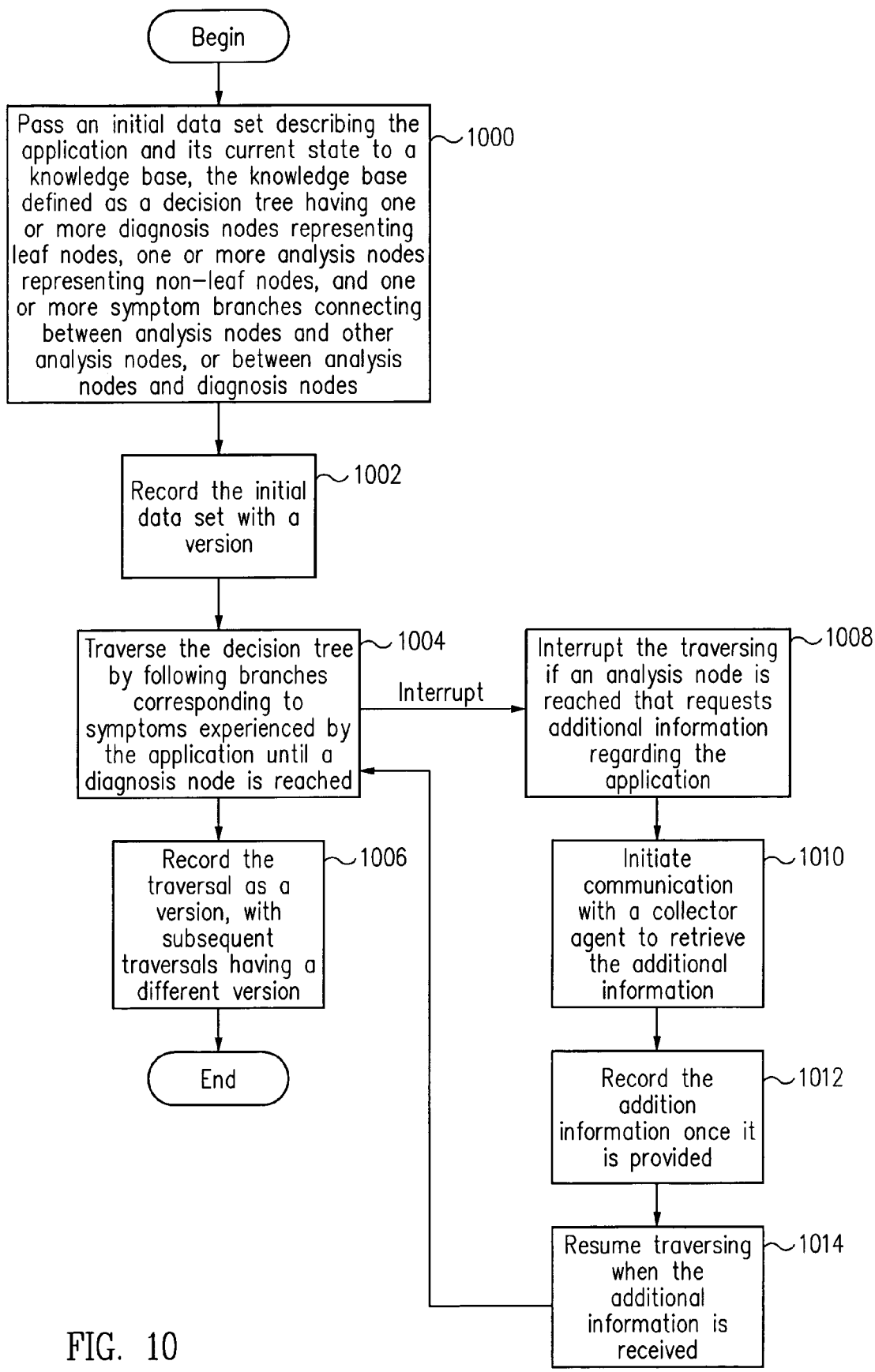
FIG. 10 is a flow diagram illustrating a method for diagnosing an application in accordance with another embodiment of the present invention.

FIG. 10 is a flow diagram illustrating a method for diagnosing an application in accordance with another embodiment of the present invention. At 1000, an initial data set describing the application and its current state may be passed to a knowledge base, the knowledge based defined as a decision tree having one or more diagnosis nodes representing leaf nodes, one or more analysis nodes representing non-leaf nodes, and one or more symptom branches connecting between analysis nodes and other analysis nodes or between analysis nodes and diagnosis nodes. However, one of ordinary skill in the art will recognize that the decision tree may be more general, for example, by simply having non-leaf nodes and leaf nodes. The diagnosis nodes may indicate proposed diagnoses for the application and/or proposed remedies for the application. The symptom branches may indicate possible symptoms of the application. The analysis nodes may indicate information required to determine which symptom branches to follow during traversal. These analysis, nodes may further indication additional information regarding the application that may be required to determine which symptom branches to follow during traversal.

At 1002, this initial data set may be recorded with a version (described later). At 1004, the decision tree may be traversed by following branches corresponding to symptoms experienced by the application until a leaf node is reached. At 1006, this traversal may be recorded as a version, with subsequent traversals having a different version. While the flow diagram appears to indicate that the recording occurs subsequent to the traversal, it in fact may be occurring as traversal progresses. In an embodiment of the present invention, each version may be assigned a number, with subsequent versions having a higher number, perhaps incremented by 1. However, other numbering or identification schemes may be used for the numbering, such as assigning decimal numbers for minor version changes (e.g., 1.1 if the second traversal is not much different from the first, but 2.0 if the second traversal is very different from the first). Furthermore, letters rather than numbers may be used.

At 1008, the traversing may be interrupted if an analysis node is reached that requests additional information regarding the application. At 1010, communication may be initiated with a collector agent to retrieve the additional information. This may include sending one or more collection descriptors to the collector agent, the collection descriptors defining one or more probes to execute and data to be filtered from the probes. Probes are programs that measure performance statistics on the application. At 1012, this additional information may be recorded with the version once it has been provided. At 1014, the traversing may be resumed when the additional information is received. This entire process allows the several different features described earlier to be utilized. These will be discussed briefly here.

The first is that the decision tree may be traversed again from a beginning node, and the traversal may not be interrupted if an analysis node is reached that requests additional information regarding the application if the additional information is stored in a database under a previous version and the additional information is still accurate (there need not be any determination of the accuracy, it may be as simple as providing the user a choice as to which of the information in the previous version can be re-used).

The second is that the decision tree may be traversed again from an analysis node encountered during the traversing, the traversing again beginning by following a different branch from the analysis node than was followed during the traversal. This allows a user to, for example, step back up one or more analysis nodes and enter a different answer or provide different information such that a different branch is followed than during a first traversal.

The third is that the traversal of the decision tree may be resumed from the point where it left off if the traversing is interrupted for any reason (such as a crash).

Figure 11:
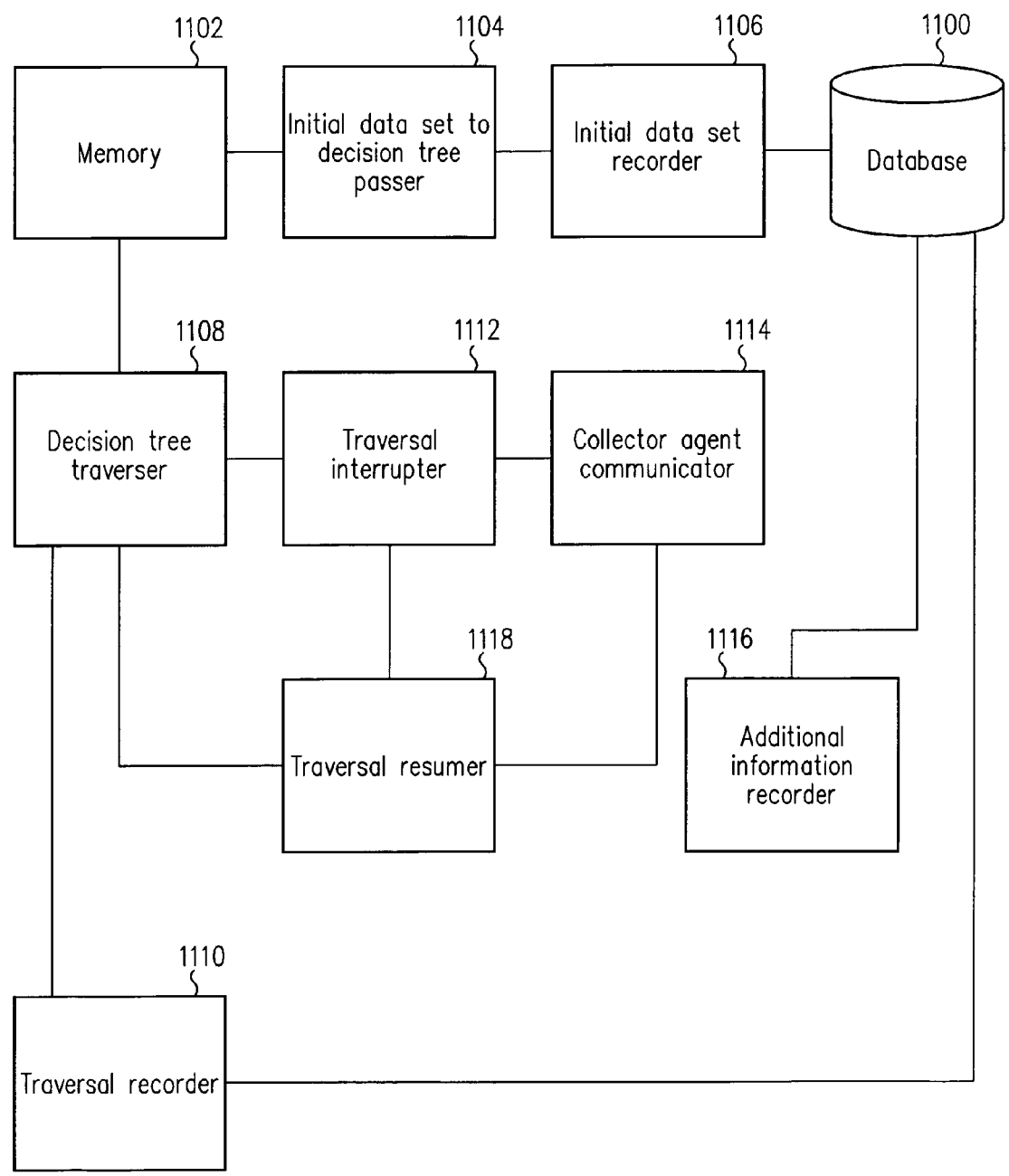
FIG. 11 is a block diagram illustrating an apparatus for diagnosing an application in accordance with another embodiment of the present invention.

FIG. 11 is a block diagram illustrating an apparatus for diagnosing an application in accordance with another embodiment of the present invention. A database 1100 may be used to store versions of the environment and traversals captured. A memory 1102 may be used to store a knowledge base. An initial data set to decision tree passer 1104 coupled to the memory 1102 may pass an initial data set describing the application and its current state to a knowledge base, the knowledge based defined as a decision tree having one or more diagnosis nodes representing leaf nodes, one or more analysis nodes representing non-leaf nodes, and one or more symptom branches connecting between analysis nodes and other analysis nodes or between analysis nodes and diagnosis nodes. However, one of ordinary skill in the art will recognize that the decision tree may be more general, for example, by simply having non-leaf nodes and leaf nodes. The diagnosis nodes may indicate proposed diagnoses for the application and/or proposed remedies for the application. The symptom branches may indicate possible symptoms of the application. The analysis nodes may indicate information required to determine which symptom branches to follow during traversal. These analysis nodes may further indication additional information regarding the application that may be required to determine which symptom branches to follow during traversal.

An initial data set recorder 1106 coupled to the database 1100 and to the initial data set to decision tree passer 1104 may record this initial data set with a version (described later). A decision tree traverser 1108 coupled to the initial data set to decision tree passer 1104 and to the memory 1100 may traverse the decision tree by following branches corresponding to symptoms experienced by the application until a leaf node is reached. A traversal recorder 1110 coupled to the decision tree traverser 1108 and to the database 1100 may record this traversal as a version, with subsequent traversals having a different version. This may be occurring as traversal progresses. In an embodiment of the present invention, each version may be assigned a number, with subsequent versions having a higher number, perhaps incremented by 1. However, other numbering or identification schemes may be used for the numbering, such as assigning decimal numbers for minor version changes (e.g., 1.1 if the second traversal is not much different from the first, but 2.0 if the second traversal is very different from the first). Furthermore, letters rather than numbers may be used.

A traversal interrupter 1112 coupled to the decision tree traverser 1108 may interrupt the traversing if an analysis node is reached that requests additional information regarding the application. A collector agent communicator 814 coupled to the traversal interrupter 1114 may initiate communication with a collector agent to retrieve the additional information. This may include sending one or more collection descriptors to the collector agent, the collection descriptors defining one or more probes to execute and data to be filtered from the probes. Probes are programs that measure performance statistics on the application. An additional information recorder 1116 coupled to the database 1100 may record this additional information with the version once it has been provided. A traversal resumer 1118 coupled to the traversal interrupter 1112, the collector agent communicator 1114, and the decision tree traverser 1108 may resume the traversing when the additional information is received. This entire process allows the several different features described earlier to be utilized.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for diagnosing an application, comprising:
   traversing a decision tree, said decision tree representing a knowledge base and having non-leaf nodes with one or more branches representing possible symptoms, and leaf nodes with no branches, by following branches corresponding to symptoms experienced by the application until a leaf node is reached;
   recording said traversal as a version, with subsequent traversals having a different version;
   passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;
   interrupting said traversing if an analysis node is reached that requests additional information regarding the application; and
   traversing said decision tree again from a beginning node, and not interrupting said traversing if an analysis node is reached that requests additional information regarding the application if said additional information is stored in said database under a previous version and said additional information is still accurate.

2. A method for diagnosing an application, comprising:
   traversing a decision tree, said decision tree representing a knowledge base and having non-leaf nodes with one or more branches representing possible symptoms, and leaf nodes with no branches, by following branches corresponding to symptoms experienced by the application until a leaf node is reached;
   recording said traversal as a version, with subsequent traversals having a different version;
   passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;
   interrupting said traversing if an analysis node is reached that requests additional information regarding the application; and
   traversing said decision tree again from an analysis node encountered during said traversing, said traversing said decision tree again beginning by following a different branch from said analysis node than was followed during said traversing.

3. A method for diagnosing an application, comprising:
   traversing a decision tree, said decision tree representing a knowledge base and having non-leaf nodes with one or more branches representing possible symptoms, and leaf nodes with no branches, by following branches corresponding to symptoms experienced by the application until a leaf node is reached;

recording said traversal as a version, with subsequent traversals having a different version;

passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;

interrupting said traversing if an analysis node is reached that requests additional information regarding the application; and resuming said traversal by using said traversal version if said traversing is interrupted for any reason.

4. An apparatus for diagnosing an application, comprising:
- a database;
- a decision tree traverser;
- a traversal recorder coupled to said decision tree traverser and to said database;
- a traversal interrupter coupled to said decision tree traverser; and
- a traversal resumer coupled to said traversal interrupter and to said decision tree traverser.

5. The apparatus of claim 4, further comprising:
- a collector agent communicator coupled to said traversal interrupter and to said traversal resumer.

6. An apparatus for diagnosing an application, comprising:

means for traversing a decision tree, said decision tree representing a knowledge base and having non-leaf nodes with one or more branches representing possible symptoms, and leaf nodes with no branches, by following branches corresponding to symptoms experienced by the application until a leaf node is reached;

means for recording said traversal as a version, with subsequent traversals having a different version means for passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;

means for interrupting said traversing if an analysis node is reached that requests additional information regarding the application; and means for traversing said decision tree again from a beginning node, and not interrupting said traversing if an analysis node is reached that requests additional information regarding the application if said additional information is stored in said database under a previous version and said additional information is still accurate.

7. An apparatus for diagnosing an application, comprising:

means for traversing a decision tree, said decision tree representing a knowledge base and having non-leaf nodes with one or more branches representing possible symptoms, and leaf nodes with no branches, by following branches corresponding to symptoms experienced by the application until a leaf node is reached;

means for recording said traversal as a version, with subsequent traversals having a different version means for passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;

means for interrupting said traversing if an analysis node is reached that requests additional information regarding the application; and means for traversing said decision tree again from an analysis node encountered during said traversing, said traversing said decision tree again beginning by following a different branch from said analysis node than was followed during said traversing.

8. An apparatus for diagnosing an application, comprising:

means for traversing a decision tree, said decision tree representing a knowledge base and having non-leaf nodes with one or more branches representing possible symptoms, and leaf nodes with no branches, by following branches corresponding to symptoms experienced by the application until a leaf node is reached;

means for recording said traversal as a version, with subsequent traversals having a different version means for passing an initial data set describing the application and its current state to said knowledge base, said knowledge base defined as said decision tree and having one or more diagnosis nodes representing leaf nodes, one or more analysis nodes representing non-leaf nodes, and one or more symptom branches connecting between analysis nodes and other analysis nodes, or between analysis nodes and diagnosis nodes;

means for interrupting said traversing if an analysis node is reached that requests additional information regarding the application; and means for resuming said traversal by using said traversal version if said traversing is interrupted for any reason.

* * * * *